S. L. KYLE.
NUT LOCK.
APPLICATION FILED JAN. 25, 1913.

1,076,679.

Patented Oct. 28, 1913.

WITNESSES

INVENTOR
S. L. KYLE

BY

ATT'Y.

UNITED STATES PATENT OFFICE.

SAMUEL LAW KYLE, OF OTTAWA, ONTARIO, CANADA.

NUT-LOCK.

1,076,679.　　　　Specification of Letters Patent.　　Patented Oct. 28, 1913.

Application filed January 25, 1913.　Serial No. 744,250.

*To all whom it may concern:*

Be it known that I, SAMUEL LAW KYLE, a subject of the King of Great Britain, and resident of the city of Ottawa, Province of Ontario, Dominion of Canada, have invented certain new and useful Improvements in Nut-Locks, of which the following is the specification.

This invention relates to improvements in nut locks, particularly to the type in which a locking pin extends in grooves in an abutting washer and nut, and the general object of the invention is to improve and simplify the parts of the nut lock to better adapt them to perform the functions required of them.

A particular feature of the invention resides in the location and character of the grooves in the nut whereby they are better adapted to retain the locking pin therein and to prevent any movement of the nut.

A further feature of the invention relates to the provision of an increased number of adjacent grooves in the washer whereby the nut may be locked in any position.

A further feature still relates to an improved locking pin adapted to cut a thread in the groove so that it may be securely held in locked position but which at the same time may be rapidly and quickly withdrawn therefrom. For a full description of the invention however reference must be had to the accompanying specification and drawings.

Figure 1:
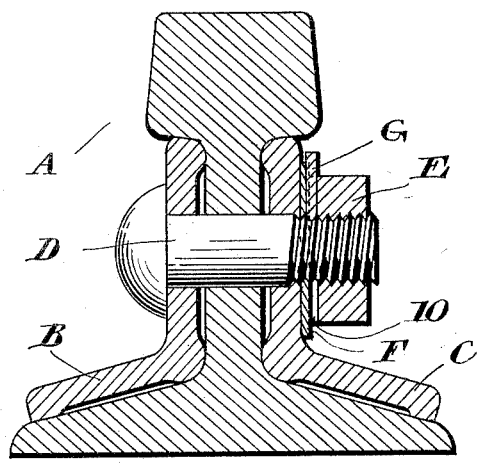
Figure 2:
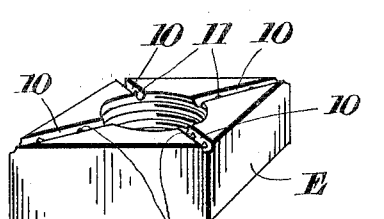
Figure 3:
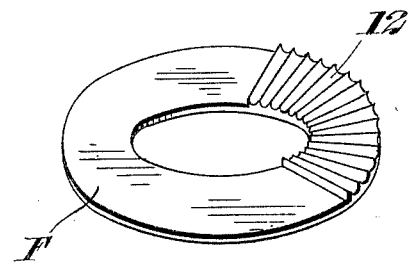
Figure 4:
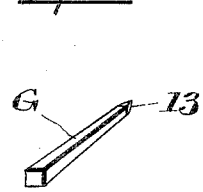
Figure 5:
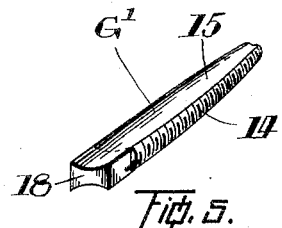
Figure 6:
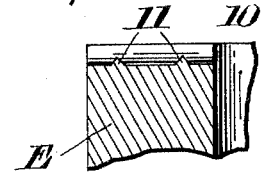
Figure 7:
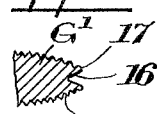

In the drawings, Figure 1 is a cross section through an embodiment of the invention applied to a rail joint. Fig. 2 is a perspective view of the nut showing the grooves. Fig. 3 is a perspective view of the washer. Fig. 4 is a perspective view of the locking pin. Fig. 5 is a perspective view of an alternative form of locking pin. Fig. 6 is a longitudinal sectional detail taken through the groove in the nut. Fig. 7 is an enlarged sectional detail of the end of the locking pin shown in Fig. 5.

In the drawings like characters of reference indicate corresponding parts in all the figures.

Referring to the drawings, A represents a rail, B and C two angle plates connected by the bolt D.

E represents the nut on the bolt which in accordance with the present invention is provided on the inner face with four radial grooves 10 which extend diagonally to the corners of the nut. The shape of these grooves will correspond with that of the locking pin, as shown they are round but they may be square, round or diagonal in cross section to suit the locking pin used. To assist in retaining the locking pin in the grooves one or more projections or studs 11 may be formed in the bottom of the grooves.

F represents a washer adapted to extend between the nut and the surface of the angle plates.

In accordance with this invention a plurality of radially extending grooves 12 are provided in the outer face of the washer corresponding in shape to the grooves 10. These grooves 12 are placed immediately adjacent to each other and a sufficient number provided to extend more than one quarter way around the washer so that it will always be possible to lock the nut in any position to which it has been tightened. It will be noted that as the grooves extend more than one quarter way around the washer one or other of the grooves 10 in the nut E must always be above one of the grooves 12.

G represents a locking pin which is driven between two grooves 10 and 12 which register with each other. In the embodiment shown in Fig. 4 the locking pin is tapered square in cross section and formed with a chisel point 13 adapted to be driven into the threads of the bolt.

The alternative form of locking pin G′ shown in Figs. 5 and 7 is tapered and provided with screw threading 14. In order to cause the screw threading to cut the surface of the grooves longitudinal channels 15 are formed in the pin after the manner of a tap. The point of the pin is formed with a recess 16 which forms a circular cutting edge 17 adapted to cut into the threads of the bolt. The outer end 18 of the locking pin may be squared to enable it to be grasped by a wrench or other tool by which it may be rotated.

It will be seen that in all cases the locking pin is adapted to be forced into the threads of the bolt and so prevent any relative movement between the nut and the bolt as well as between the washer and the nut. Where a chisel point is used either on the round or square form of pin, it will be so placed in position as to cut across the threads of the bolt. Where the circular pin is used, the end of it will also cut the threads of the bolt and will be firmly forced against the bolt between the connection formed between the pin and washer and nut owing to the manner in which the threads on the pin will cut into the recesses on the washer and nut.

What I claim as my invention is:—

1. In a nut lock and in combination, a washer having a plurality of radial grooves immediately adjacent to each other and extending for more than one quarter way around the circumference, a nut having four radial grooves extending diagonally into the corners and a tapered thread cutting locking pin adapted to extend in registering grooves on the washer and nut and to prevent relative movement between them.

2. In a nut lock and in combination, a washer having a radial groove, a bolt, a nut having a radial groove extending diagonally into the corners and a thread cutting locking pin adapted to fit the grooves in the washer and nut and to prevent relative movement between them.

3. In a nut lock and in combination, a washer having a radial groove, a bolt, a nut having a radial groove extending diagonally into the corners and a thread cutting locking pin longitudinally channeled after the manner of a tap adapted to fit the grooves in the washer and nut and to prevent relative movement between them.

4. In a nut lock and in combination, a washer having a radial groove, a bolt, a nut having a radial groove extending diagonally into the corners and a tapered thread cutting locking pin having the point recessed and formed with a circular cutting edge, said locking pin being adapted to fit the grooves in the washer and nut and to prevent relative movement between them.

5. In a nut lock and in combination, a washer having a radial groove, a bolt, a nut having a radial groove extending diagonally into the corners and a tapered thread cutting locking pin having a squared outer end, said locking pin being adapted to fit the grooves in the washer and nut and to prevent relative movement between them.

In witness whereof I have hereunto set my hand in the presence of two witnesses.

SAMUEL LAW KYLE.

Witnesses:
RUSSEL S. SMART,
PEARL M. GARRAN.

---

Copies of this patent may be obtained for five cents each, by addressing the "Commissioner of Patents, Washington, D. C."